United States Patent [19]

Zerver

[11] 4,091,664

[45] May 30, 1978

[54] TIGHTENING WRENCH WITH ANGLE INDICATOR

[75] Inventor: Hermann J. Zerver, Remscheid, Germany

[73] Assignee: Hazet-Werk Hermann Zerver, Remscheid, Germany

[21] Appl. No.: 684,851

[22] Filed: May 10, 1976

[30] Foreign Application Priority Data

May 10, 1975 Germany ............................ 2520918

[51] Int. Cl.$^2$ .......................... B25B 23/14; G01L 5/24

[52] U.S. Cl. ........................................ 73/139; 33/334; 33/391; 74/5.22; 116/DIG. 1

[58] Field of Search ...................... 81/52.4 R; 116/115, 116/124 A, DIG. 1; 73/139; 33/334, 341, 343, 370–373, 391; 74/5.22; 7/1 M

[56] References Cited

U.S. PATENT DOCUMENTS

| | | | |
|---|---|---|---|
| 1,602,276 | 10/1976 | Lutz | 33/391 |
| 2,889,729 | 6/1959 | Orner | 81/52.4 |
| 3,052,375 | 9/1962 | Kyser | 33/334 X |
| 3,292,678 | 12/1966 | Noga | 81/52.4 R X |
| 3,531,808 | 10/1970 | McCue | 7/1 M |
| 3,885,306 | 5/1975 | Herman | 33/334 X |

*Primary Examiner*—James J. Gill
*Assistant Examiner*—Charles Gorenstein
*Attorney, Agent, or Firm*—Joseph A. Geiger

[57] ABSTRACT

A tightening wrench with an angle indicator for the final tightening operation on threaded fasteners, the angle indicator having a pointer or other angle indicating element which assumes a given angular orientation under the influence of an ambient force field of gravity or magnetism and maintains this orientation while the wrench is rotated, thereby giving an angular reading of the tightening angle. Gravity is used with a weighted pointer, magnetism with a needle compass or liquid compass. Also usable is a gyro, or a freely rotatable mass of high inertia. The wrench may be a torque wrench.

11 Claims, 5 Drawing Figures

1
2
3
4
5

1
2
3
5
5a
300
280
260
240
220
200
320
340
20
160
140

TIGHTENING WRENCH WITH ANGLE INDICATOR

BACKGROUND OF THE INVENTION

1. Field of the Invention

The present invention relates to devices for the controlled tightening of threaded fasteners, and more particularly to tightening wrenches with angle indicating devices for the tightening of screws or bolts and nuts to a predetermined tensile stress.

2. Description of the Prior Art

In many applications of threaded fasteners, especially highly stressed clamping screws and clamping bolts, it is essential that the fasteners be subjected to a predetermined clamping preload, not only in order to avoid accidental loosening of the fastener combination, but, more importantly, in order to preclude unacceptable stress reversals in the fasteners and in the clamped parts. The establishment of a controlled fastener preload is particularly important in connection with applications where a series of fasteners is involved and where variations in the clamping tensions from fastener to fastener would not only risk the failure of certain fasteners, but also result in distortions of the parts which are clamped together.

The most common approach taken in order to achieve this result concerns itself with the application of a predetermined tightening torque to the fasteners, under the assumption that the torque applied is a reliable indicator of the tensile stress condition created in the fastener members. Accordingly, there are available in the prior art numerous suggestions of torque limiting and torque indicating devices, known under the general designation of torque wrenches, which are intended to establish a controlled predetermined tightening condition in threaded fasteners. But, no matter how precisely the devices themselves limit the torque applied to a clamping screw or nut, they cannot take into consideration differences and irregularities that exist in the relationship between the applied torque and the tensile stress created in the fastener combination by that torque. This relationship is greatly influenced by the friction conditions between the mating threads, on the one hand, and by the friction between the rotationally sliding clamping faces of the fastener and one of the clamped parts, on the other hand. Obviously, various factors may influence the actual friction conditions, chief among them being the state of lubrication and the quality of the machined surfaces, or of the applied surface coatings, for example. Small differences in lubrication, for example, may result in considerable variations in bolt tensions, even though a uniform torque was applied in all cases to the bolt head or to the nut.

It has therefore already been suggested that, in order to avoid this source of unpredictability in the tightening of threated fasteners, the latter should first be pre-tightened with a small torque, and that the final tightening to the desired tension near the yield stress of the fastener combination should be controlled on the basis of a particular angle of tightening rotation between the fastener members, rather than on the basis of a particular torque applied thereto. It has thus been suggested that such a tightening wrench for screws, or bolts and nuts include an angle indicating device with means for adjusting the starting angular position of the indicating device and means producing a reading of the angular displacement during the final tightening operation. The adjustability of the starting angular position is necessary, because it is generally accepted as impossible or impractical to eliminate the randomness of the angular relationship between the torque transmitting surfaces on the fastener members, e.g. the hexagon facets of a nut or bolt, and the threads of that part.

One prior art solution, therefore, suggests an angle indicating device for use in conjunction with a tightening wrench, where the device includes a stationary member engaging one of the clamped parts in the area surrounding the screw or nut and carrying a reference disc with angular gradations, the latter being angularly adjustable in relation to the stationary member, being frictionally held in place with the aid of permanent magnets. A hub which is solidary with a centrally located torque transmitting member carries one or several pointers which move over the gradations of the reference disc. The stationary member, when not engaged against the clamped parts, is loosely carried by the central hub of the tightening wrench. This device is disclosed in the German Pat. No. 1,603,768.

Among the shortcomings of the device just described are its structural complexity and its manufacturing cost, in addition to its considerable bulk. The device is also limited in regard to its use, being dependent upon a particular structural cooperation between the stationary member of the angle indicating device and the clamped part which is to position the former.

Another prior art solution, intended to have a greater versatility of application, suggests an angle indicating device which consists of two elements which are structurally separate from the tightening wrench itself and of which one can be attached to the wrench, while the other is intended for attachment to the clamped part or some other nearby stationary reference support. Again, permanent magnets are used to provide the necessary angular adjustability. As an alternative to attaching the pointer member to the tightening wrench, it is further suggested to use an indicator disc which slips over the hexagon profile of the bolt or nut. Such a device is disclosed in the German Auslegeschrift (Published Allowed Application) No. 2,128,348.

The above prior art device has many of the shortcomings of the earlier-described prior art device, requiring attachment of the stationary indicator member to the clamped part or to some other stationary support which, consequently, needs to be of magnetically permeable metal. The fact that the component members of the indicating device are not attached to one another and to the wrench further necessitates special care in the alignment of these parts and entails the risk of loss of a component.

Still another prior art device is disclosed in U.S. Pat. No. 2,889,729. There, the tightening wrench carries an indexing ring which is rotatably connected to the wrench head and which has an angular gradation. In the handle of the wrench is incorporated a spring-loaded pawl engaging a notch of the indexing ring as long as the torque remains below a predetermined pre-tightening limit determined by a spring-biased handle portion of the wrench. Upon reaching the pre-tightening torque, the pawl of the wrench releases the indexing ring, which is then manually held in place with a finger which engages a protruding knob of the ring, so that the subsequent angular advance of the tightening wrench is indicated by the movement of the released pawl with respect to the gradation on the indexing ring.

This device is comparatively complex in structure and accordingly costly. It requires a flat space around the head of the wrench and, for proper operation, necessitates a certain degree of skill in the manual release and positioning of the indexing ring.

SUMMARY OF THE INVENTION

It is a primary objective of the present invention to provide an improved tightening wrench and angle indicating device in which most or all of the aforementioned disadvantages and shortcomings are eliminated. Another objective of the invention is to provide a device which is simple in structure and therefore inexpensive, while being compact in its dimensions and suitable for use in a great variety of bolt tightening situations.

The present invention proposes to attain the above objectives by suggesting a novel tightening wrench and angle indicator, in which the angle indicating device is characterized by a wrench-supported independent pointing member which is rotatable with respect to the wrench head and which assumes and maintains a predetermined angular orientation with respect to stationary structure, an orientation which will not change under angular displacement of the tightening wrench. It follows that the latter, when equipped with a suitably graduated disc, will produce an angular reading of tightening displacement relative to the fixed angular position of the pointing member.

This novel device has the particular advantage of not necessitating the establishment of an angular reference point for the tightening angle prior to each final tightening operation, because the pointing member finds and maintains its angular position automatically at all times. The only operative adjustment step necessary is a simple rotation of the graduated reference disc to a convenient reference position, such as a zero-mark, at the beginning of the final tightening operation. This means that the novel device dispenses with any need for a structural interrelationship between the angle indicating device and the clamped parts. It also means that the device can be more compact and much lighter than prior art devices, and that the adaptability of the device to various types of wrenches and to various limitations of available space, is greatly increased. The last mentioned feature is particularly important with respect to recessed, not readily accessible screw heads and nuts.

The present invention also lends itself conveniently for incorporation in a regular torque wrench, thereby offering a combination of the advantages of the latter, for the establishment of a given pre-tightening torque, with the features of the angle indicating device, for the final tightening of the fastener members over a given angle.

In one preferred embodiment of the invention, the independent pointing member relies on the action of gravity on a pendulum or weighted pointer for the establishment of the reference orientation which, in this case, is either vertical, or coincident with a vertical plane, if the axis of rotation is not horizontal. The gravity-controlled pointing member is thus simply a freely rotatable, unilaterally weighted pointer.

In another preferred embodiment of the invention, the independent pointing member relies for the establishment of a fixed angular orientation on an ambient magnetic field, for instance the magnetic field of the earth. The angle indicating device may thus be a simple compass whose needle maintains its orientation independently of the angular position of the compass housing. The latter is preferably attached to the top of the tightening wrench and angularly adjustable relative to the latter against a friction resistance. Instead of using a simple needle compass, it is of course also possible to use more complex compasses, such as a liquid compass, or a gyrocompass.

In general, the independent pointing member may be any type of device which is capable of maintaining a fixed angular orientation under angular displacement of the supporting structure. Accordingly, one could also utilize for this purpose a motor-driven gyro, or the independent pointing member may simply be an element of great rotary inertia which is rotatably supported with minimal friction, so that the angular displacement of the support is incapable of imparting an angular movement to the pointing member.

BRIEF DESCRIPTION OF THE DRAWINGS

Further special features and advantages of the invention will become apparent from the description following below, when taken together with the accompanying drawings which illustrate, by way of example, several embodiments of the invention, represented in various figures as follows.

DESCRIPTION OF THE PREFERRED EMBODIMENTS

Figures 1, 2:
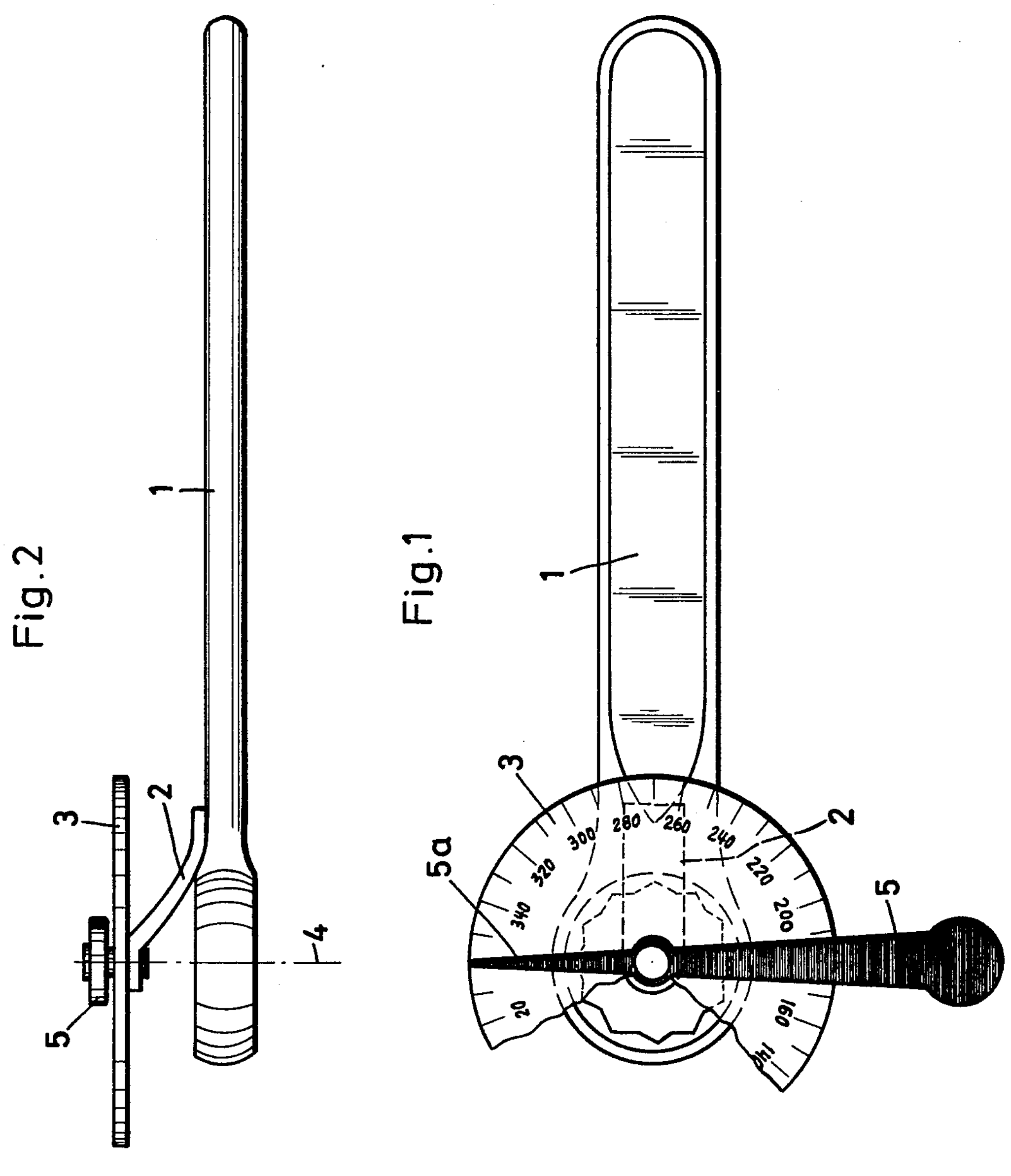
FIG. 1 is a frontal view of a tightening wrench with a gravity-controlled angle indictor, representing a first embodiment of the invention.
FIG. 2 is a side view of the device of FIG. 1.

Referring to FIGS. 1 and 2 of the drawing, there can be seen a box end tightening wrench 1 of conventional shape, to the upper side of which is attached a short supporting bracket 2. This bracket carries a graduated disc or dial 3 in axial alignment with the rotational axis 4 of the fastener combination (not shown), as represented by the axis of the box end opening of the wrench 1. Above the dial 3 is supported a pendulum or weighted pointer 5 whose shorter extremity forms a needle pointer 5_a_ producing a reading on the dial 3. The weighted pointer 5 is rotatably supported with respect to the bracket 2 and dial 3 about the axis 4. The dial 3 is likewise rotatable with respect to the supporting bracket 2, but engages the latter with a certain amount of friction so as to normally follow the angular movements of the tightening wrench 1, while being conveniently resettable by hand against the friction.

The tightening wrench of FIGS. 1 and 2, because of its reliance upon a pendulum or weighted pointer, will not operate, when the fastener axis is vertical or near vertical. The latter is therefore preferably horizontal, but may also be inclined, provided the pointer is journalled in a rigid low-friction bearing.

The screw or nut which is to be tightened with this tightening wrench is first pre-tightened with a predetermined torque, whereupon the box end of the wrench is engaged over the screw head or nut and the dial 3 is manually rotated until the zero mark is at the highest point of the dial 3, in alignment with the extremity 5*a* of the pointer 5. During the subsequent final tightening operation over a prescribed angle, the dial 3 rotates with the tightening wrench 1, while the weighted pointer 5 remains in the upwardly pointing position, thereby giving a convenient reading of the angular displacement executed by the tightening wrench.

Figure 3:
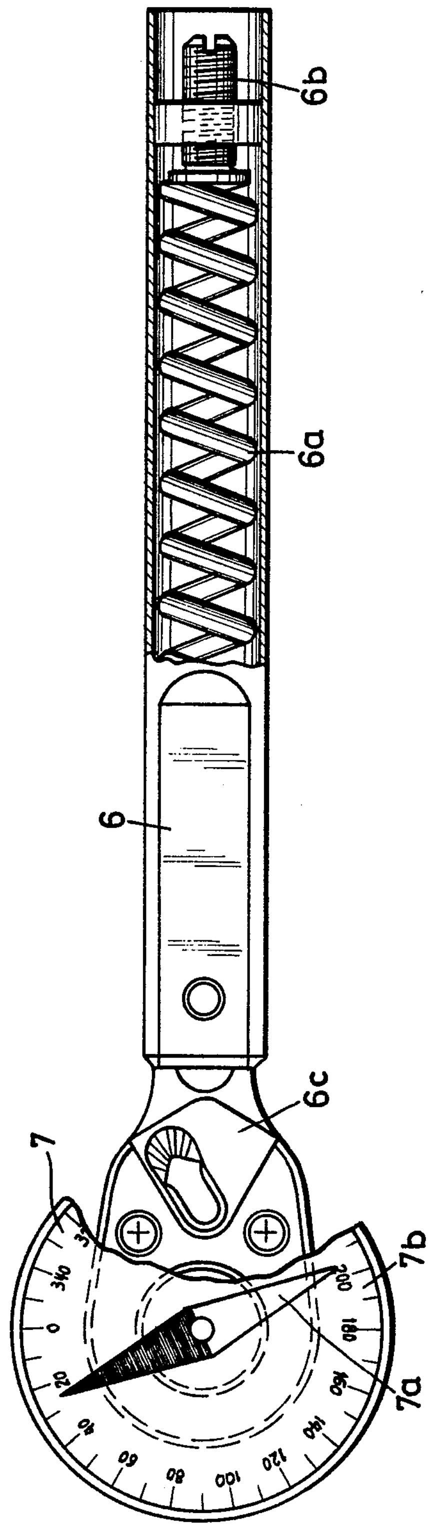
FIG. 3 shows in a plan view a magnetic-field-responsive compass-type angle indicating device incorporated in a torque wrench and representing a second embodiment of the invention.

In FIG. 3 is shown a second embodiment of the invention, where the regular box end wrench of the previous embodiment has been replaced with a torque wrench 6. This torque wrench makes it possible to conveniently adjust and establish the required pre-tightening torque on the fastener combination, without removing the tool from the screw head or nut prior to the final tightening operation. The pre-tightening torque can be adjusted by adjusting the axial position of the set screw 6*b* in relation to the torque limiting spring 6*a*. The wrench of FIG. 3 further features a reversible ratchet mechanism 6*c* by means of which repeated pre-tightening and/or tightening movements can be executed, without disengaging the wrench from the fastener, and which also permits reversal of the tool for a fastener unscrewing operation.

On the upper side of the ratchet head of the wrench 6 is arranged, in axial alignment with the driver, a magnetic compass 7 whose housing 7*b* is rotatably adjustable in relation to the driver against a frictional resistance. The magnetic compass 7 includes a compass needle 7*a* of which one arm is made of magnetically permeable metal so as to point at all times to the magnetic north pole of the earth, or to some other stationary magnetic north pole created for this purpose.

This tightening wrench is not suitable for operation on fasteners with a horizontal axis, but is preferably used for vertically oriented fasteners only. A complete screw or nut tightening operation can be performed with this wrench, without removing it from the screw head or nut. As the particular fastener is being progressively tightened with a reciprocating angular ratchet movement, the torque wrench 6 will indicate when the pre-tightening condition is reached, whereupon the housing 7*b* of the compass indicator is rotated so that its zero mark is in alignment with the compass needle 7*a*. The final tightening operation can then be performed by advancing the wrench 6 over the required tightening angle.

Figure 4:
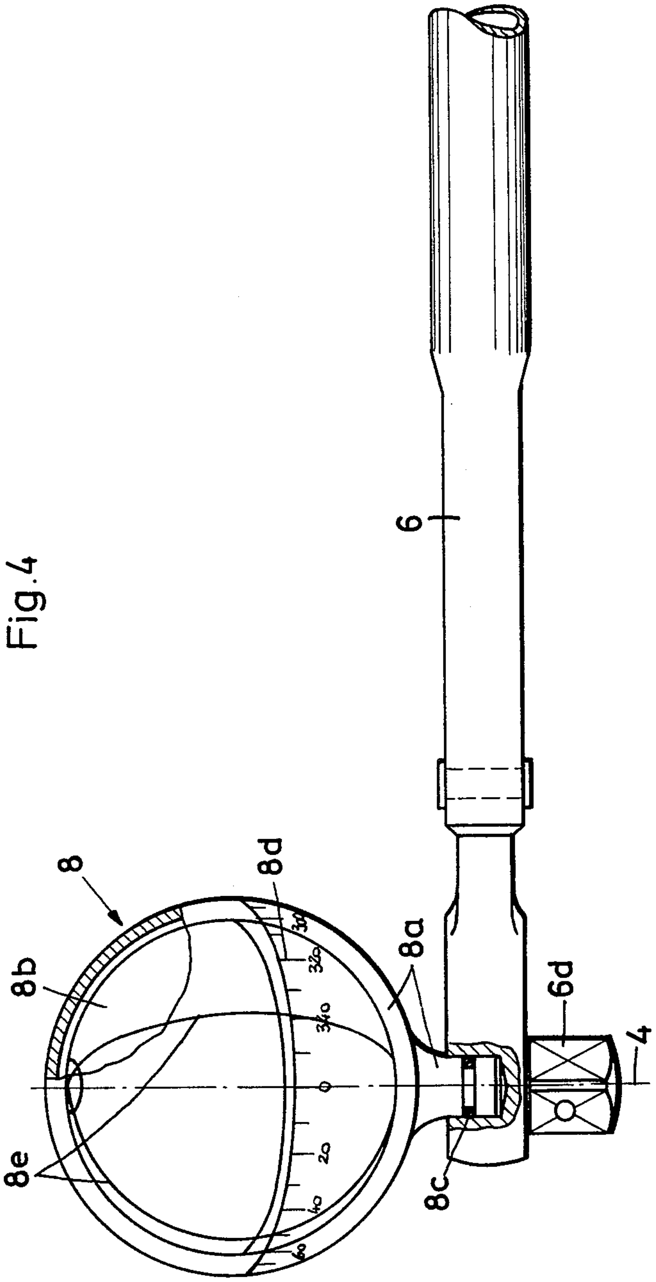
FIG. 4 shows, in a partially cross-sectioned side view, a modified version of the embodiment of FIG. 3, using a liquid compass.

In the embodiment of FIG. 4 the needle compass of the previously described embodiment has been replaced with a liquid compass 8, thereby rendering the tightening wrench suitable for use on bolts and screws of any orientation. The wrench itself is again a torque wrench 6 which may include a reversible ratchet mechanism (not shown). The spherical housing 8*a* of the liquid compass 8 has a cylindrical socket extension reaching in a matching axial bore of the driver 6*d*, a friction ring 8*c* being interposed between the socket extension of the compass housing 8*a* and the bore of the driver 6*d*.

This device, by virtue of the self-orienting feature of the spherical liquid compass, is suitable for all fastener orientations. The liquid compass consists essentially of a transparent spherical housing 8*a* marked with gradations. Inside of it is arranged a spherical compass element which floats in relation to the housing 8*a* in a supporting liquid. The spherical compass element 8*b* is weighted so that it will always assume an upright position, regardless of the orientation of the axis 4 of the compass housing 8*a*. Suitable meridian lines on the spherical compass member 8*b* cooperate with the gradations of the compass housing 8*a* to produce the desired angular reading during the tightening operation.

It should be understood that the axial alignment between the compass and the driver of the torque wrench on the rotational axis 4 of the latter is not a necessary prerequisite for the proper operation of the device of this invention.

Figure 5:
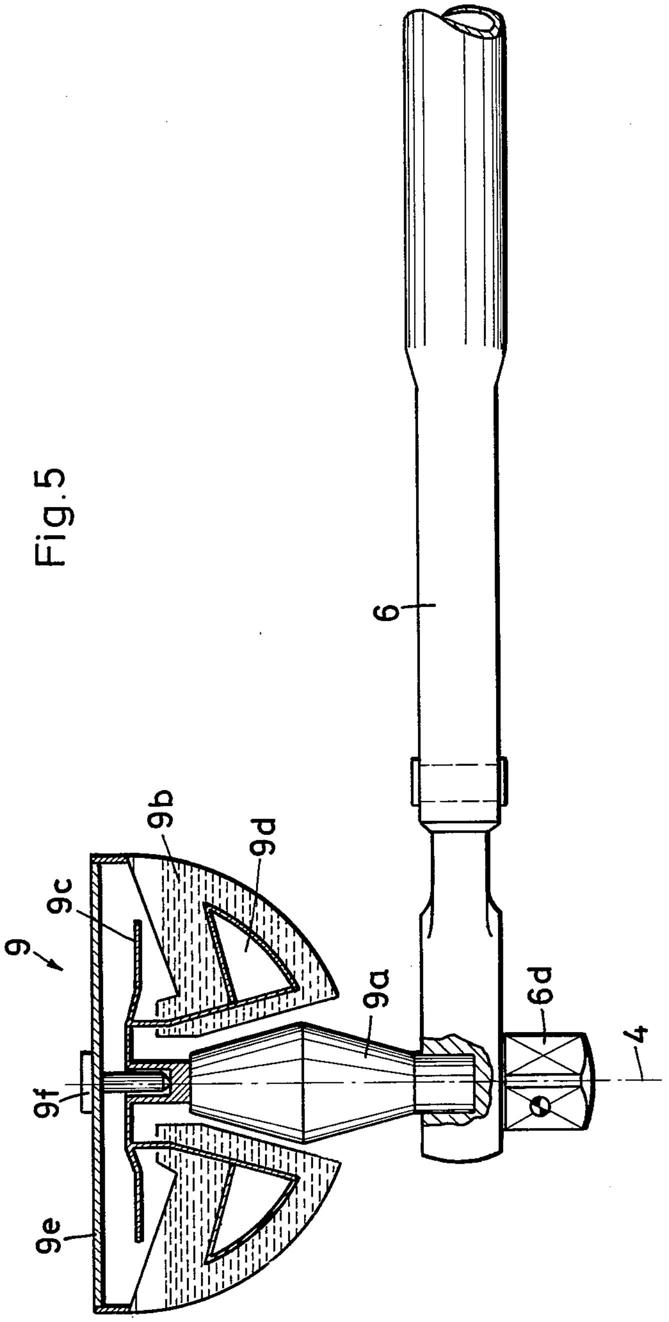
FIG. 5 shows, in a view similar to FIG. 4, still another embodiment of the invention, featuring a motor-driven gyro as part of the angle indicating device.

In FIG. 5 is illustrated a fourth embodiment of the invention, featuring again a torque wrench 6, to the upper side of which is connected a motor-driven gyro 9. The gyro 9 is arranged inside a gyro housing 9*a* which is attached to the head of the tightening wrench 6. The cross-sectional representation of FIG. 5 shows a dial disc 9*c* arranged inside the hemisphere-shaped housing of the gyro 9, floats 9*d* being attached to the dial 9*c*. The floats 9*d* are surrounded by mercury 9*b*. The lid 9*e* of the gyro housing is transparent, a centering pin 9*f* reaching through the lid 9*b* to the gyro. Like the previously described embodiment of FIG. 4, this embodiment of the tightening wrench is operable under any angular orientation of the fastener members.

Instead of using a magnetically responsive member in order to establish an absolute angular orientation of the latter independently of the angular position of the tightening wrench, it is also possible to simply use a large mass for the indicator sphere of FIG. 4, for example, which mass is supported on a low-friction support, so that no angular movement is transmitted to the indicator member, when the tightening wrench is rotated. The sphere then simply maintains its orientation, regardless of the movements of the tightening wrench. The use of a liquid for the support of the sphere, as suggested in the liquid compass of FIG. 4, makes it possible to obtain a virtually friction-free support of the sphere inside the surrounding housing. The latter is again rotatably adjustable in relation to the tightening wrench, so that the desired angular readings are produced between the markings on the non-rotating sphere and on the transparent housing surrounding the latter.

It should be understood, of course, that the foregoing disclosure describes only preferred embodiments of the invention and that it is intended to cover all changes and modifications of these examples of the invention which fall within the scope of the appended claims.

I claim the following:

1. A device for the controlled tightening of threaded fasteners with the aid of a visual reading of the angular tightening displacement executed by the device, the tightening device comprising in combination:

a tightening member adapted to be operatively connected to the threaded fastener, for the transmission of a tightening torque thereto;

a first angle indicating element in the form of a circular dial which is connected to the tightening member so as to be rotatable about an indication axis which is substantially parallel to the axis of rotation of the tightening member, when engaged with a threaded fastener; and a second angle indicating element in the form of a pointer which is freely rotatable relative to the dial and the tightening member about said indication axis; and wherein the two angle indicating elements define means for producing a visual reading of angular displacement of one element relative to the other;

the circular dial and the tightening member define between them cooperating friction surfaces which are located in the vicinity of the indication axis, so that the dial, while normally following the angular movements of the tightening member, is resettable with respect thereto by grasping its periphery with the fingers; and the pointer includes means for establishing and maintaining for itself a fixed angular orientation, as determined by an ambient force field, said orientation remaining substantially unchanged, under the rotational movements of the tightening member and of the dial.

2. A tightening device as defined in claim 1, wherein the tightening member is a torque wrench.

3. A tightening device as defined in claim 1, wherein the tightening member is a wrench with torque-transmitting facets; and the dial and pointer are connected to one side of the wrench in substantial alignment with a threaded fastener axis as defined by said torque-transmitting facets.

4. A tightening device as defined in claim 1, wherein said pointer orientation maintaining means includes a weighted arm on the pointer which, responding to the ambient gravity field, maintains the pointer in a fixed orientation, provided the axis of angle indication is other than vertical.

5. A device for the controlled tightening of threaded fasteners with the aid of a visual reading of the angular tightening displacement executed by the device, the tightening device comprising in combination:

a tightening member adapted to be operatively connected to the threaded fastener, for the transmission of a tightening torque thereto;

a first angle indicating element in the form of a dial which is connected to the tightening member; and a second angle indicating element in the form of a pointer which is freely rotatable relative to the dial and the tightening member about an indication axis which is substantially parallel to the axis of rotation of the tightening member, when engaged with a threaded fastener; and wherein the two angle indicating elements define means for producing a visual reading of angular displacement of one element relative to the other; and the pointer includes a magnetically permeable arm which, under the influence of an ambient magnetic field, maintains the pointer in a substantially fixed angular orientation, under rotational movements of the tightening member and of the dial.

6. A tightening device as defined in claim 5, wherein the tightening member is a torque wrench.

7. A tightening device as defined in claim 5, wherein the tightening member is a wrench with torque-transmitting facets, the dial and pointer being connected to one side thereof; and the dial is rotatably connected to the wrench, so as to be angularly resettable relative to the wrench, about said indication axis, against a frictional resistance.

8. A tightening device as defined in claim 5, wherein the pointer is a compass needle and the dial is part of a compass housing surrounding the needle.

9. A device for the controlled tightening of threaded fasteners with the aid of a visual reading of the angular tightening displacement executed by the device, the tightening device comprising in combination:

a tightening member in the form of a wrench with torque-transmitting facets adapted to be operatively connected to a threaded fastener for the transmission of a tightening torque thereto; and first and second angle indicating elements supported by the tightening member and defining an axis of angle indication which is substantially parallel to the axis of rotation of the tightening member, and wherein one of the two angle indicating elements is freely rotatable relative to the other about said indication axis;

the two angle indicating elements carry markings producing a visual reading of angular displacement of one element relative to the other;

the two angle indicating elements are parts of a self-levelling liquid compass, with a substantially spherical housing constituting one of said elements; and the compass housing is rotatably connected to the wrench, so as to be angularly resettable relative to the wrench, about said indication axis, against a frictional resistance.

10. A device for the controlled tightening of threaded fasteners with the aid of a visual reading of the angular tightening displacement executed by the device, the tightening device comprising in combination;

a tightening member in the form of a wrench with torque-transmitting facets adapted to be operatively connected to a threaded fastener for the transmission of a tightening torque thereto; and first and second angle indicating elements supported by the tightening member and defining an axis of angle indication which is substantially parallel to the axis of rotation of the tightening member, and wherein one of the two angle indicating elements is freely rotatable relative to the other about said indication axis;

the two angle indicating elements carry markings producing a visual reading of angular displacement of one element relative to the other; and the two angle indicating elements are parts of a gyrocompass which further includes a drive motor and a housing which is connected to the wrench.

11. A device for the controlled tightening of threaded fasteners with the aid of a visual reading of the angular tightening displacement executed by the device, the tightening device comprising in combination;

a tightening member in the form of a wrench with torque-transmitting facets adapted to be operatively connected to a threaded fastener for the transmission of a tightening torque thereto; and first and second angle indicating elements supported by the tightening member and defining an axis of angle indication which is substantially parallel to the axis of rotation of the tightening member, and wherein one of the two angle indicating elements is freely rotatable relative to the other about said indication axis;

the two angle indicating elements carry markings producing a visual reading of angular displacement of one element relative to the other; and one of the two angle indicating elements is a mass of considerable rotary inertia which is freely rotatable relative to the other angle indicating element.

* * * * *